United States Patent [19]

Haas et al.

[11] Patent Number: 5,060,358
[45] Date of Patent: Oct. 29, 1991

[54] APPARATUS AND METHOD OF INSTALLING A GASKET IN A CHANNEL MEMBER

[75] Inventors: Adam J. Haas; Glenn E. Crabtree, both of Louisville, Ky.

[73] Assignee: General Electric Company, Louisville, Ky.

[21] Appl. No.: 419,384

[22] Filed: Oct. 10, 1989

[51] Int. Cl.[5] .............................................. B23P 19/02
[52] U.S. Cl. ...................................... 29/235; 29/464; 29/525.1; 414/758; 414/773
[58] Field of Search ................. 29/235, 464, 468, 525, 29/798, 799, 281.1, 281.3, 281.4, 281.5; 414/773, 758, 764, 765, 767; 49/285, 489, 490; 312/214

[56] References Cited

U.S. PATENT DOCUMENTS

| | | | |
|---|---|---|---|
| 3,359,053 | 12/1967 | Hagendoorn | 312/296 |
| 3,827,682 | 8/1974 | Foster, Sr. et al. | 414/758 X |
| 4,126,923 | 11/1978 | Cislak et al. | 29/416 |
| 4,203,190 | 5/1980 | Temple et al. | 29/451 |
| 4,235,005 | 11/1980 | James | 29/281.1 |
| 4,469,383 | 9/1984 | Losert | 312/296 |
| 4,492,016 | 1/1985 | Smets et al. | 29/432 |
| 4,644,698 | 2/1987 | Gerdes et al. | 49/478 |
| 4,829,652 | 5/1989 | Haas et al. | 29/451 |

Primary Examiner—Joseph M. Gorski
Assistant Examiner—S. Thomas Hughes
Attorney, Agent, or Firm—Radford M. Reams; H. Neil Houser

[57] ABSTRACT

Apparatus and method for installing a stretchable rectangular shaped gasket in a rectangular shaped channel member secured to a refrigerator door. A rectangular shaped frame is formed with side rails, the side rails as viewed in lateral cross-section having a vertical leg forming an outer periphery of the frame and joining a horizontal leg perpendicular thereto, the vertical leg being slightly larger than the outside dimensions of the door. The frame is pivoted to an upwardly facing position and the gasket is placed on the horizontal leg of the frame. The refrigerator door is positioned under the frame with the rectangular shaped channel member facing toward the frame and the frame is pivoted from an upwardly facing position to a downwardly facing position and moved downwardly to a lower position to contact the gasket with the channel member. Force is applied at the corners of the gasket sufficient to force the gasket into the channel member at the corners and thereafter the frame is moved to a raised position and the refrigerator door removed from under the frame.

6 Claims, 6 Drawing Sheets

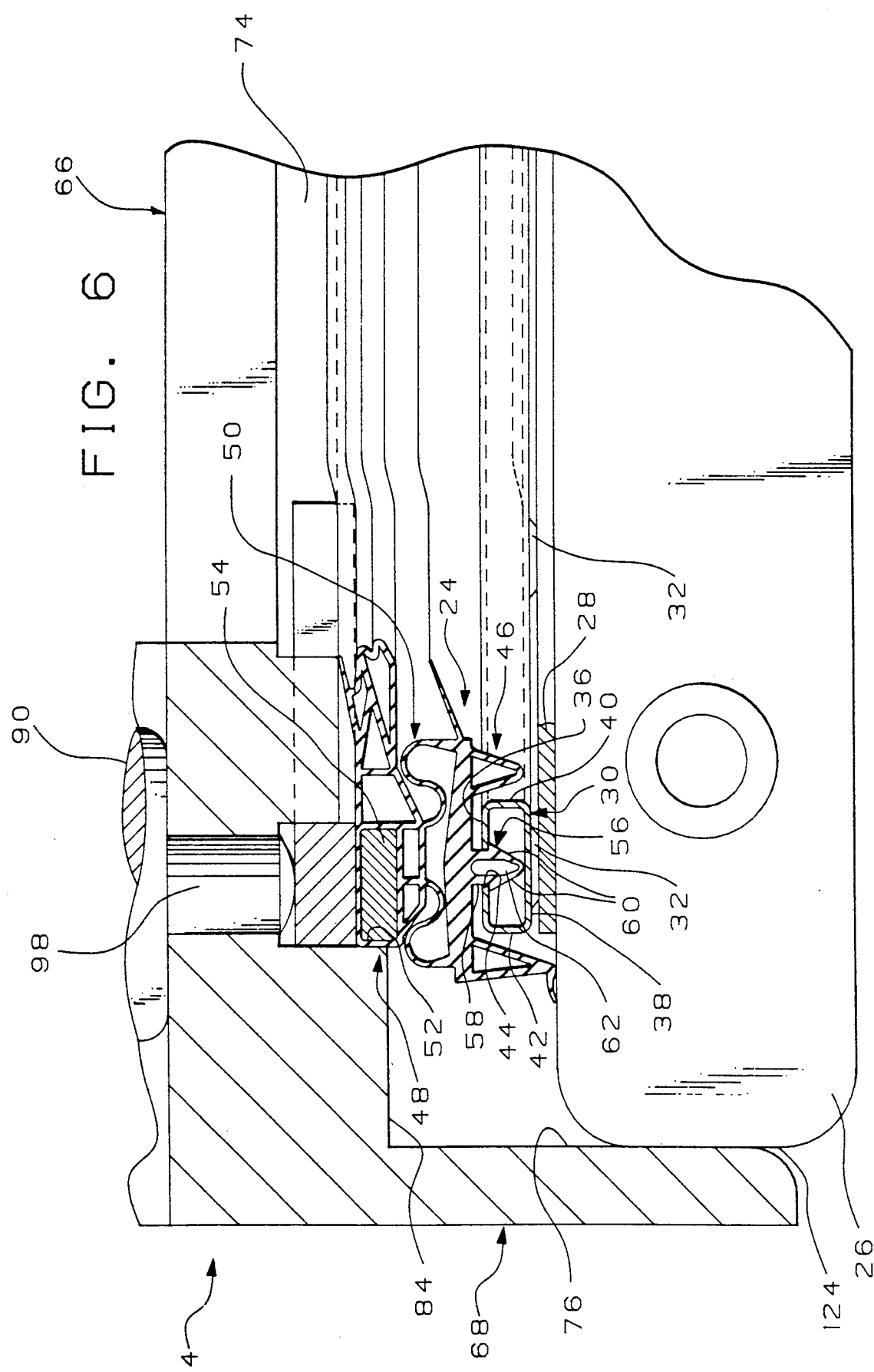

APPARATUS AND METHOD OF INSTALLING A GASKET IN A CHANNEL MEMBER

BACKGROUND OF THE INVENTION

The present invention relates to apparatus and method for installing an elongated stretchable gasket in a longitudinal channel member and more particularly to a gasket which is rectangular in shape such as a refrigerator door gasket and installing that gasket in a channel member forming a rectangle secured to the refrigerator door adjacent the peripheral edges of the door.

A well known type of gasket assembly is shown and described in U.S. Pat. Nos. 4,469,383 and 3,359,053 assigned to the same assignee as the present invention. In those patents there is described a gasket of extruded resilient material such as rubber, polyvinyl chloride, or the like. The securement of the gasket to the refrigerator door is by means of a long metal retainer strip through which fastening screws will pass to anchor the retainer strip and gasket to the door. With such a prior art gasket assembly special skills and sometimes a lot of rework is required to overcome the inherent gasket mounting problems to make certain that the gasket is properly positioned on the refrigerator door to assure good thermal sealing characteristics. To overcome these difficulties a different type of gasket assembly and method was developed and is described in U.S. Pat. No. 4,644,698 assigned to the same assignee as the present invention. In that gasket assembly there is provided elongated channel members having top, bottom, and side walls secured to the door adjacent the peripheral edges and have spaced screw openings therealong for screws that secure the channel members to the door. The channel members have a slot along the top wall and the sealing gasket has a base portion with a downwardly projecting winged dart having a body and two diverging arms projecting through the open slot in the top wall of the channel member to secure the sealing gasket to the channel member.

One of the difficulties with the invention described in U.S. Pat. No. 4,644,698 and in other gasket assembling apparatus and methods is that in the process of forcing the gasket into the retainer channel the gasket tends to stretch longitudinally relative to the retainer channels. The stretching is undesirable particularly when the gasket is rectangular shaped with the four corners joined together. The stretching of the gasket tends to bunch the gasket up at the corners so that the desired fit of the gasket to the refrigerator door to provide good thermal sealing characteristics is detrimentally affected.

U.S. Pat. No. 4,829,652, assigned to the same assignee as the present invention, discloses apparatus and method for forcing the gasket into the retainer channel without the undesirable stretching. One difficulty is that prior to utilizing that apparatus and method there is a need to place the gasket in its proper position relative to the retainer channel and hold it in place by manually seating the gasket at its four corners into the retainer channel.

By this invention, there is provided apparatus and method for installing a stretchable rectangular shaped gasket in a rectangular shaped channel member secured to a refrigerator door whereby the gasket is initially installed in the channel member at the four corners to hold the gasket in its proper position relative to the retainer channel member for subsequent complete installation of the gasket into the channel member without stretching the gasket longitudinally along the channel member.

SUMMARY OF THE INVENTION

Apparatus and method is provided for installing a stretchable rectangular shaped gasket in a rectangular shaped channel member secured to a refrigerator door. A rectangular shaped frame is formed with side rails, said side rails as viewed in lateral cross-section having a vertical leg forming an outer periphery of the frame and joining a horizontal leg perpendicular thereto, said vertical leg being slightly larger than the outside dimensions of the door. The frame is pivoted to an upwardly facing position and the gasket is placed on the horizontal leg of the frame. The refrigerator door is positioned under the frame with the rectangular shaped channel member facing toward the frame and the frame is pivoted from an upwardly facing position to a downwardly facing position and moved downwardly to a lower position to contact the gasket with the channel member. Force is applied at the corners of the gasket sufficient to force the gasket into the channel member at the corners and thereafter the frame is moved to a raised position and the refrigerator door removed from under the frame.

BRIEF DESCRIPTION OF THE DRAWINGS

FIG. 6 is a cross-sectional view of the apparatus of the present invention and a gasket assembly for a refrigerator door.

DESCRIPTION OF THE PREFERRED EMBODIMENT

Figure 1:
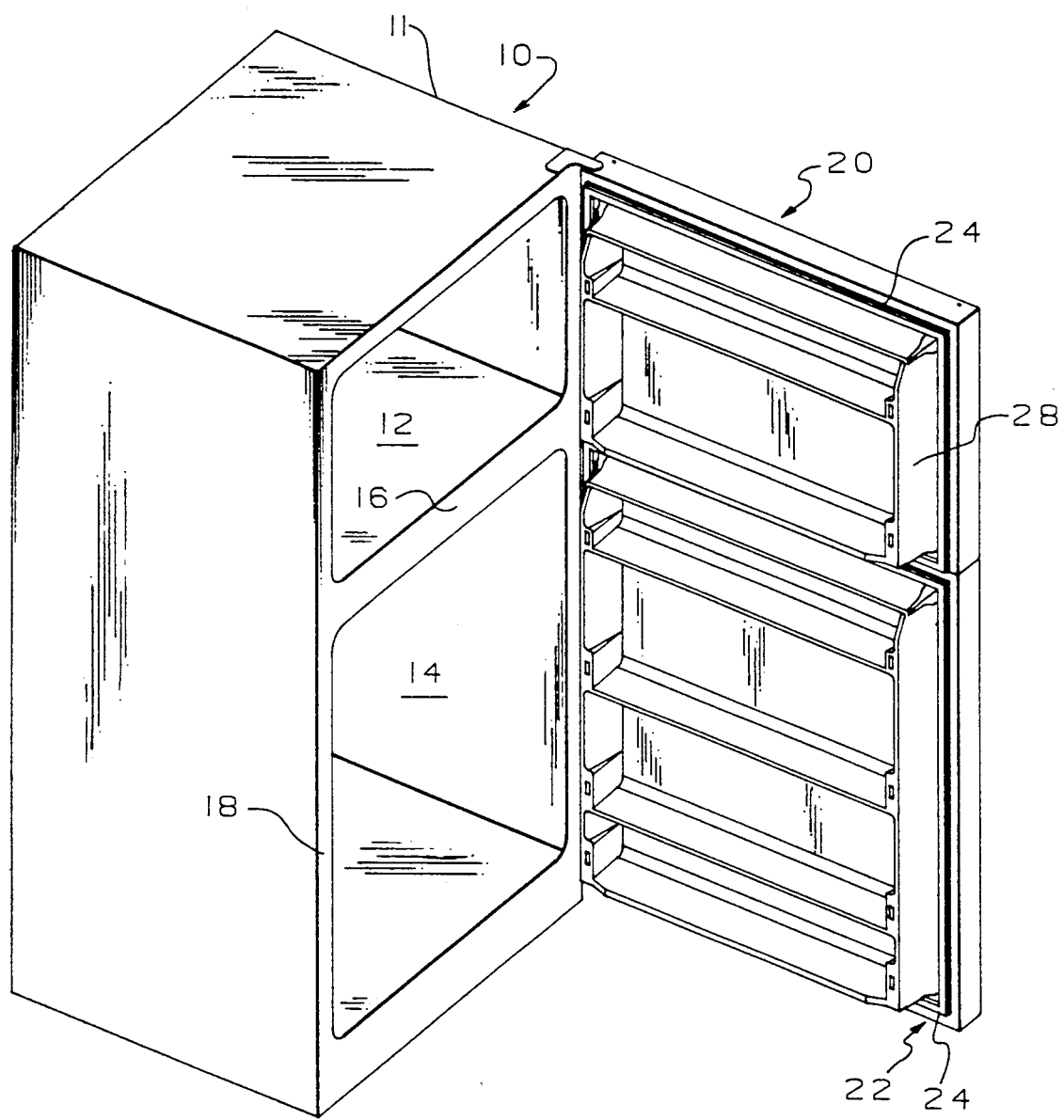
FIG. 1 is a perspective view of a household refrigerator showing a gasket assembly in place on the refrigerator doors.

With reference to FIG. 1, there is shown a household refrigerator 10 with a cabinet 11 having a freezer compartment 12 located at the top of the cabinet and a fresh food compartment 14 located at the bottom of the cabinet with a thermal insulation mullion partition 16 between the two compartments to insulate one relative to the other. Around the front opening of the refrigerator compartment is a front face 18. Hingedly secured to the cabinet 11 is a freezer door 20 and a fresh food door 22. Both doors have a gasket 24 which is made of stretchable or resilient polyvinyl chloride material and has enclosed within the gasket a strip of magnetic material so that when the door is closed the gasket will be attracted to the front face 18, thus thermally sealing the respective compartment. For the purposes of this invention there needs to be described only one of the doors, as the apparatus and method of assembling the gasket to the door is the same whether it be for the freezer door or fresh food door.

Figure 2:
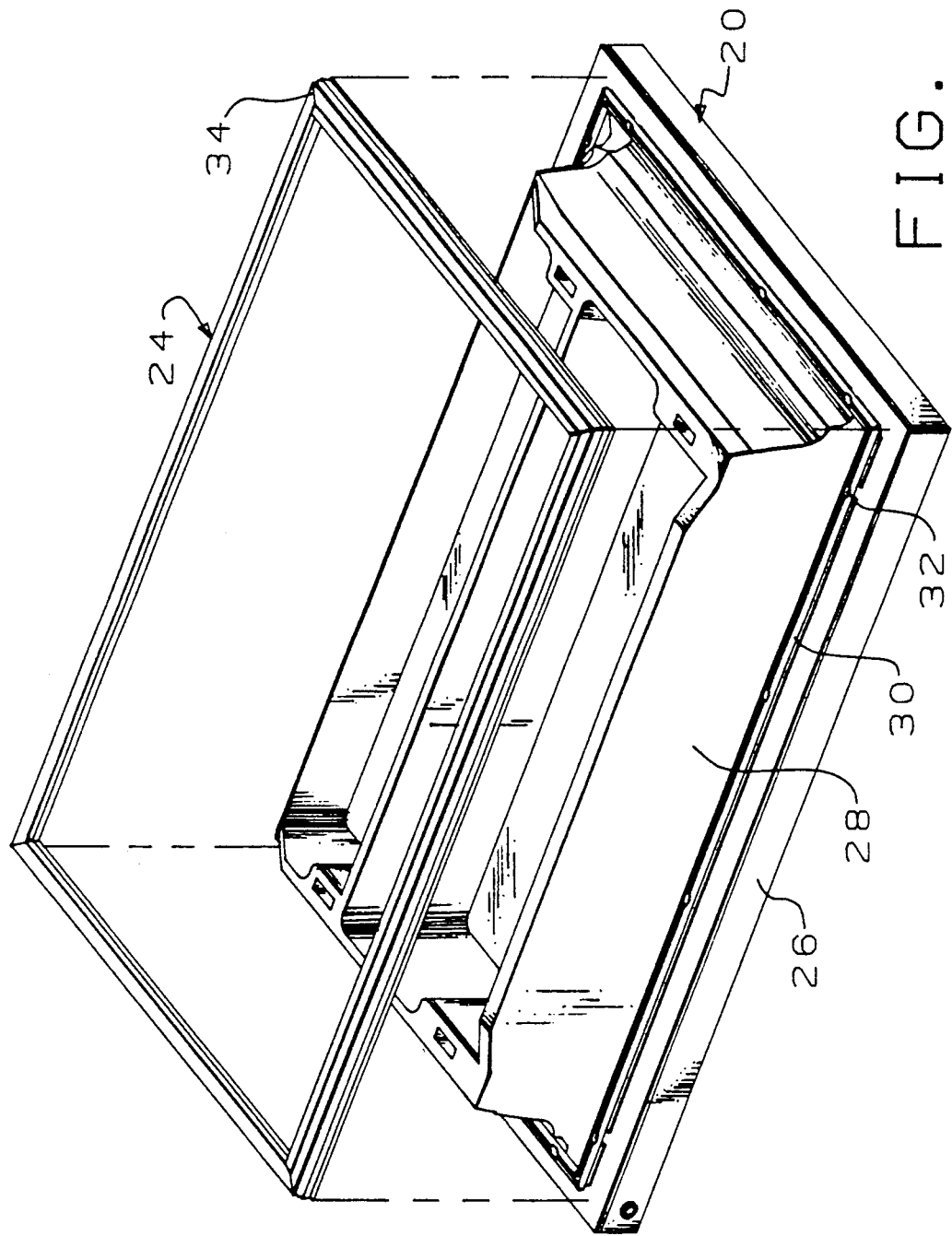
FIG. 2 is an exploded perspective view of a gasket assembly and door for a refrigerator.

With reference to FIG. 2, the freezer door 20 is shown during its assembly and prior to being hingedly secured to the refrigerator cabinet and includes an outer metal shell 26 and a plastic vacuum formed inner door or liner 28 which has various configurations to form shelves on which food items may be stored. Between the door liner 28 and the outer metal shell 26 is thermal insulation (not shown) so that the refrigerator compartment, the freezer in this case, may be maintained at its proper temperature which is usually around 0° F. with a minimum of thermal leakage. In the case of the preferred embodiment, there are gasket retainer channel members 30 secured on all four sides of the rectangular shaped door near the periphery of the door and are retained by screws (not shown) through screw holes 32 in the gasket retainer channel members 30. With this type of gasket retainer assembly, such as the one that is described in U.S. Pat. No. 4,644,698, the gasket retainer and screws secure the door liner 28 to the outer metal shell 26. The gasket is elongated and made of stretchable material and is rectangular in shape with the corners 34 joined, usually as a mitered joint. It will be noted that the longitudinal dimensions of each side of the gasket 24 is the same as the longitudinal dimensions of the channel members forming each side of the rectangular shaped gasket retainer. The gasket 24 is placed over the channel members 30 for securement thereto.

With reference to FIG. 6, the gasket 24 and the channel member 30 are shown in cross-section after installation of the gasket. The channel member has a top wall 36, a bottom wall 38, and side walls 40 and 42. The channel member has countersunk spaced screw openings or holes 32 in the bottom wall 38. The top wall 36 of the channel member has an open slot 44 along the length of the channel member. The gasket 24 includes, as viewed in lateral cross-section in FIG. 6, a base portion generally indicated as 46 and a cabinet engaging portion generally indicated as 48 with an intermediate bellows type flexible portion 50 interconnecting the base portion 46 and the cabinet engaging portion 48. The cabinet engaging portion 48 has a cavity 52 which contains a strip of magnetic material 54 which when the door is closed will be attracted to the front face 18 of the cabinet 11 and is the sole means for maintaining the door in a closed position. The base portion 46 of the gasket has a downwardly projecting winged dart 56 having a body 58 and two diverging arms 60 and the center of the winged dart 56 has a hollow cavity 62.

The gasket 24 is secured to the channel members 30 by inserting the winged dart 56 through the slot 44 in the top wall 36 of the channel members. The snapping-in of the gasket to the channel members may be accomplished because the hollow cavity 62 allows the body 58 and diverging arms 60 to be slightly collapsed and pass through the slot opening until the diverging arms are within the channel members whereupon the elastic material re-forms to the shape shown in FIG. 6. It will be noted that the body 58 of the winged dart 56 spans the distance between the edges of the slot 44 and that the diverging wings extend outwardly of the edges of the open slot 44 to be retained by the underside of the top wall 36 of the channel members. The gasket is a continuous rectangle in shape, that is, it's like a four-sided picture frame with the corners being mitered and joined together. Because the gasket is rectangular shaped and having the same longitudinal length or dimension as each of the channel members, it is important that during the installation of the gasket into the channel members that the gasket be pressed or forced in such a manner that the winged dart is inserted through the slot for its proper positioning yet at the same time not stretching the gasket longitudinally along the channel members. U.S. Pat. No. 4,829,652, assigned to the same assignee as the present invention, discloses apparatus and method for forcing the gasket into the retainer channel without the undesirable stretching of the gasket. Prior to the operation disclosed in that patent, it was necessary that the four corners of the gasket be installed in the channel member manually so that the gasket was properly oriented prior to the installation operation. The following is a description of the apparatus and method utilized to place the gasket relative to the channel members and install the gasket into the channel members at the four corners so that the gasket is oriented correctly relative to the channel members prior to the operation of inserting the gasket into the channel members along the entire length of the gasket as described in U.S. Pat. No. 4,829,652.

With reference to FIGS. 3-6, the apparatus for installing the gasket 24 into the retainer channel member 30 includes a rectangular shaped frame 64 having side rails 66, 68, 70 and 72 preferably made out of a non-marring material such as plastic. These rails as viewed in lateral cross-section have vertical legs 74, 76, 78 and 80 respectively which form the outer periphery of the frame 64 and are slightly larger than the outside dimensions of the door 20. The side rails also have horizontal legs 82, 84, 86 and 88 respectively and these horizontal legs are joined to the vertical legs perpendicular to each other.

Located at each corner of the rectangular frame 64 are force applying means 90, 92, 94 and 96. The force applying means will in the preferred embodiment be an electromechanical device with an electrically actuated plunger 98, 100, 102, and 104 respectively.

Means to pivot the frame 64 are provided which in the preferred embodiment are reversible electric motors 106 and 108 which are secured to two opposite facing side rails 68 and 72 respectively in the center thereof.

Means are provided to move the frame 64 from a raised position to a lower position and return to the raised position and in the preferred embodiment they are pneumatic cylinders 110 and 112 which have one end 114 and 116 respectively secured to the reversible electric motors 106 and 108 respectively and the other end 118 and 120 respectively being stationary. That is, the ends of the cylinders 118 and 120 may be secured to any type stationary framework that is used to support the apparatus as described.

Means are also provided to position the refrigerator door 20 under the frame 64 with the rectangular shaped channel member 30 facing toward the frame and also remove the refrigerator door from under the frame. In the preferred embodiment this means is a conveyor belt 121.

Figure 3:
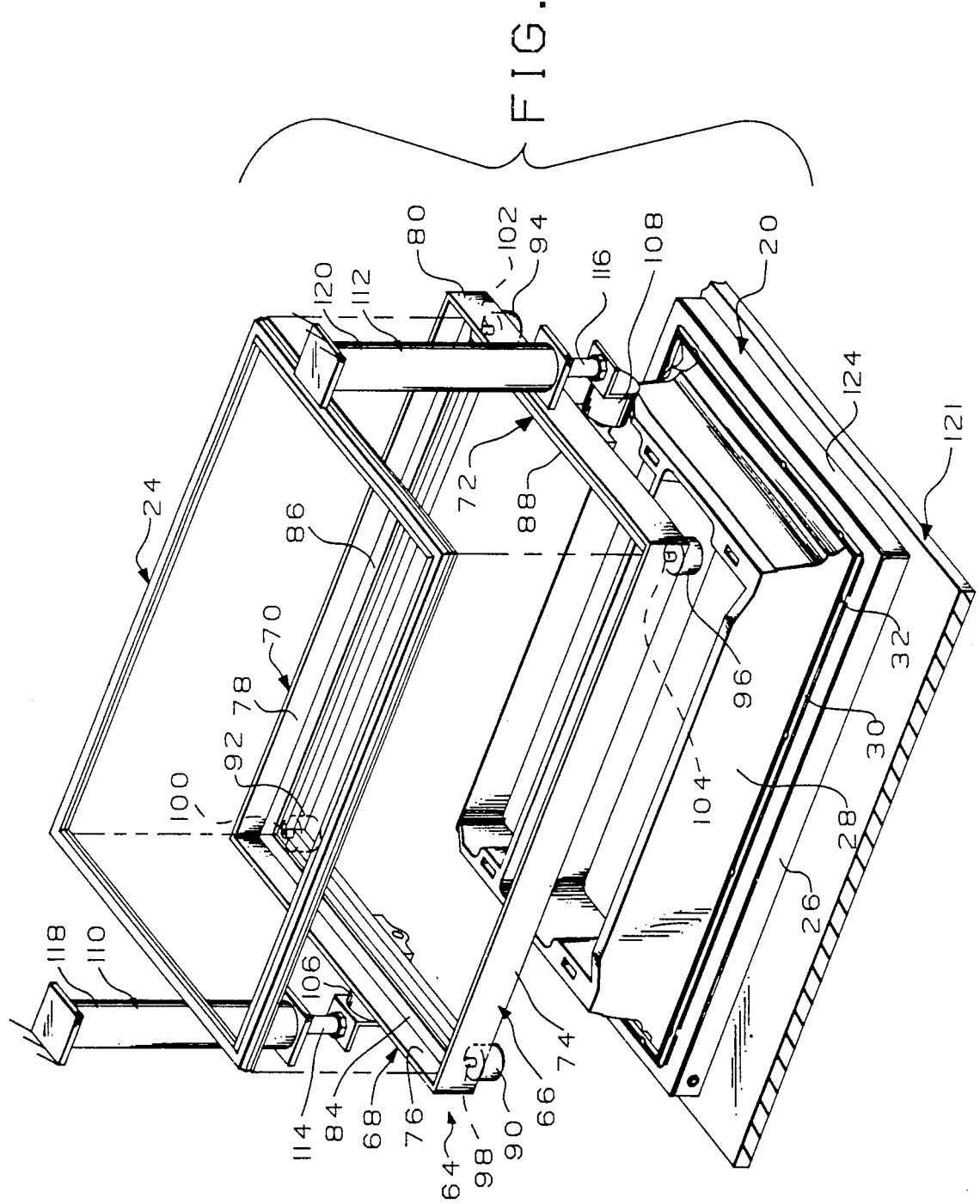
FIG. 3 is a perspective view showing a gasket assembly and door for a refrigerator with the apparatus of the present invention.
Figure 4:
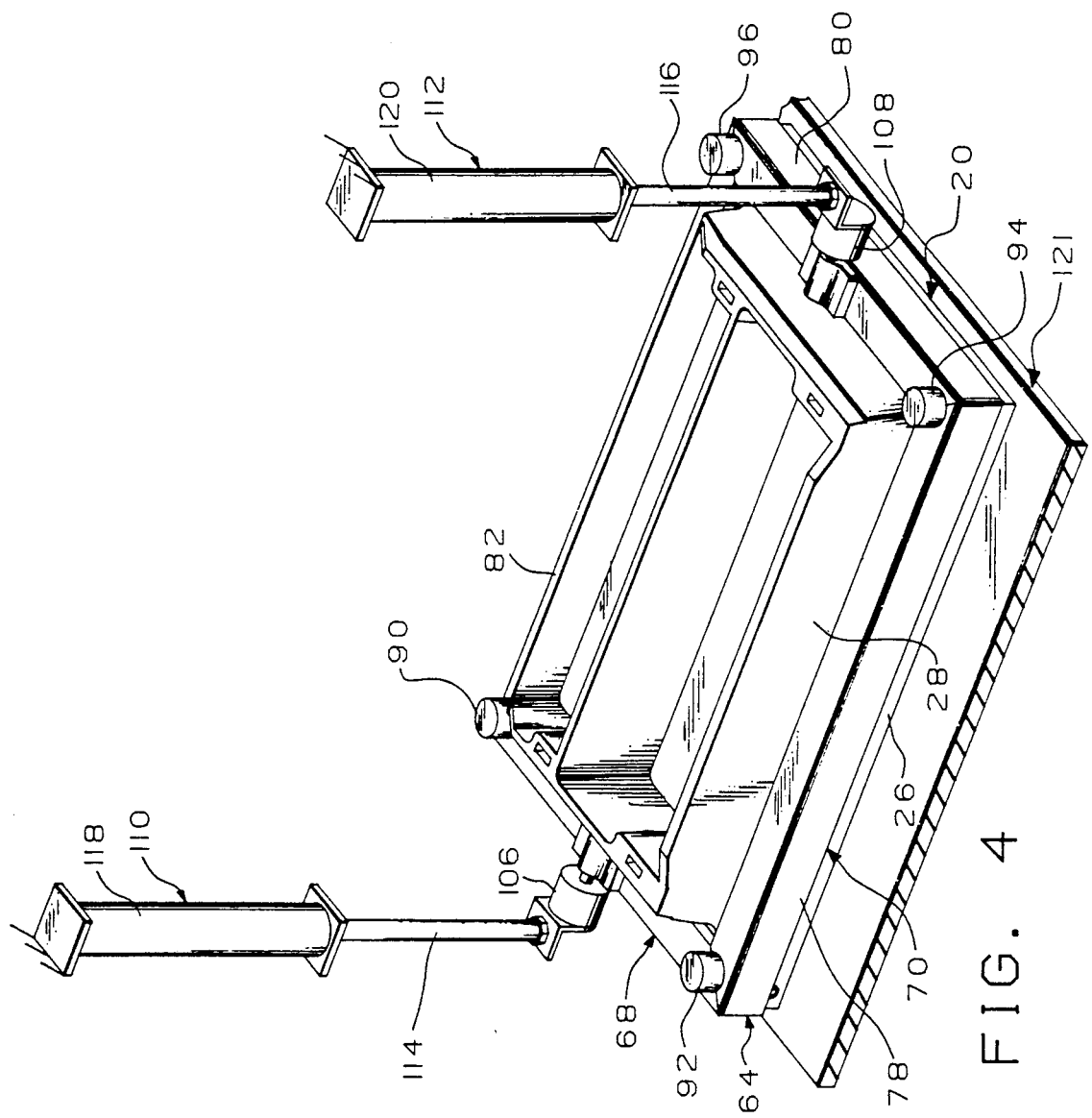
FIG. 4 is similar to FIG. 3 but showing a different orientation of the apparatus of the present invention.
Figure 5:
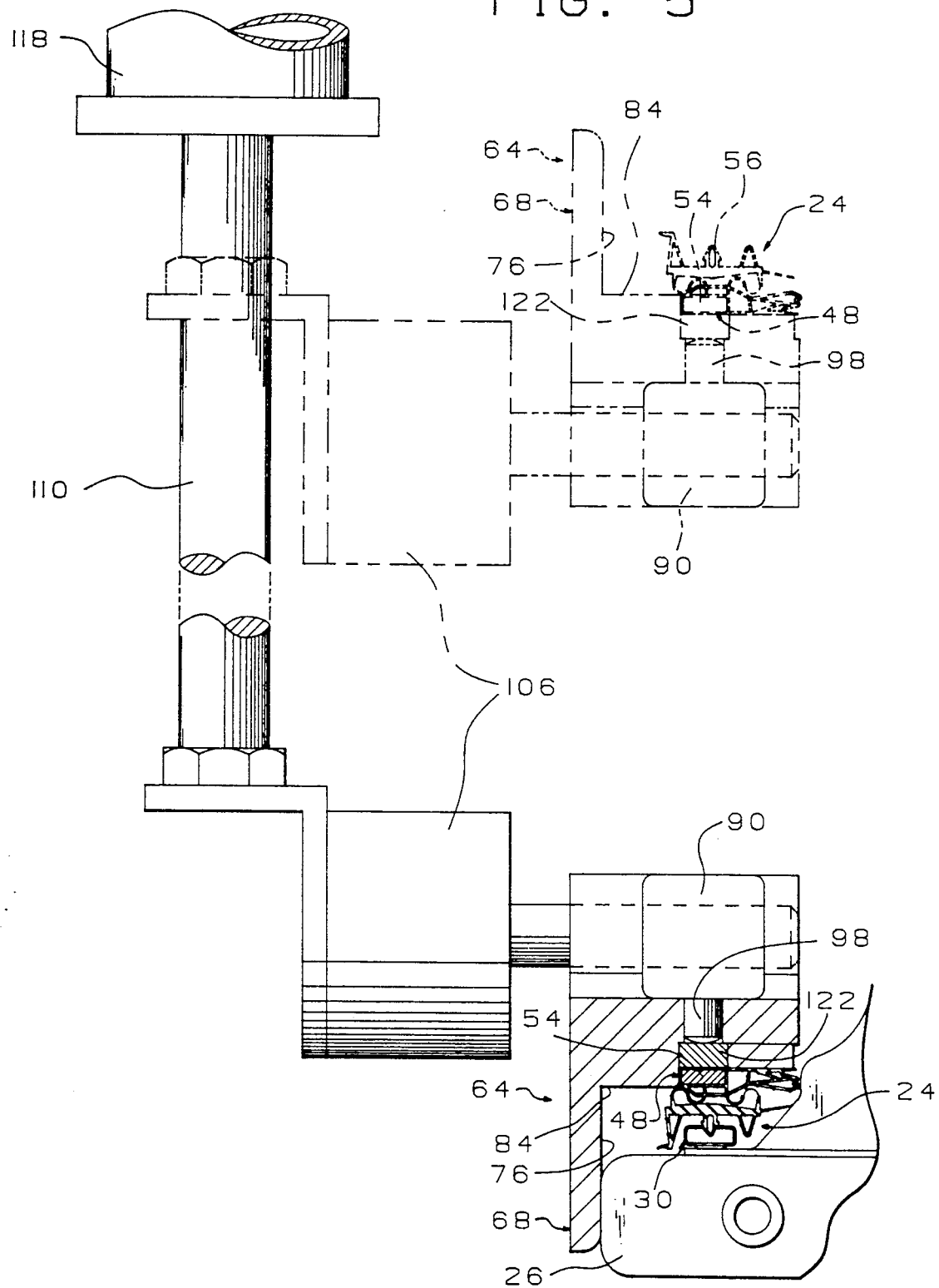
FIG. 5 is a side elevational view partially in section showing in phantom line one position of the apparatus of the present invention and in solid line another position of the apparatus of the present invention.

There will now be described the method of installing the stretchable four-sided rectangular shaped refrigerator door gasket 24 utilizing the apparatus described above. The gasket 24 has a winged dart projection 56 adapted to be inserted into channel members 30 having a top wall 36, a bottom wall 38, and side walls 40 and 42 with the top wall having an open slot 44, which channel members are secured to a rectangular shaped refrigerator door 20 adjacent the peripheral edges thereof. The gasket and channel members have the same longitudinal dimensions. With reference to FIGS. 3 and 5, the frame 64 is pivoted to an upwardly facing position as shown in FIG. 3. The gasket 24 is placed on the horizontal legs 82, 84, 86 and 88 of the frame. It will be noted particularly in FIG. 5 that the gasket 24 has the magnetic material 54 adjacent a magnetic metal element 122 imbedded in the frame which retains the gasket in its correct position on the horizontal legs. This orientation is shown in phantom line in FIG. 5 and it will be noted also that the winged dart 56 is facing upwardly in that position. The refrigerator door 20 is positioned under the frame 64 with the rectangular shaped channel members 30 facing upwardly toward the frame 64. The frame 64 is then pivoted by means of actuation of the reversible electric motors 106 and 108 from an upwardly facing position as shown in FIG. 3 and in phantom in FIG. 5 to a downwardly facing position 180° from that of the upwardly facing position. The frame 64 is then moved downwardly from the raised position to a lower position as shown in FIG. 4 and in full line in FIG. 5 so that the gasket contacts the gasket retainer members 30. This movement is accomplished by actuation of the pneumatic cylinders 110 and 112 so that the one end 114 and 116 of cylinders 110 and 112 respectively move downwardly relative to the stationary end 118 and 120 of the cylinders 110 and 112 respectively. When the frame 64 carrying the gasket 24 is placed on top of the retainer members 30 and the door 20, the vertical legs 74, 76, 78 and 80 of the frame 64 engage or abut the peripheral end wall 124 of the door so that the door 20 and the frame 64 are oriented in their proper position relative to each other. Making the frame 64 from a non-marring material prevents scratching the prepainted outer metal shell 26 when the frame 64 and door 20 engage each other. When the frame and door are in the position as shown in FIG. 4 and in solid line in FIG. 5, force is applied at the corners of the gasket sufficient to force the winged dart 56 of the gasket into the channel members at the corners. This force may be applied by the plungers 98, 100, 102 and 104 being actuated from the position shown in a full line in FIG. 5 to the position shown in FIG. 6. The force applied to the gasket forces the winged dart 56 to be inserted through the slot 44 and upon passing through the top wall 36 the diverging arms 60 expand outwardly to grip the bottom surface of the top wall and retain the gasket in its position on the retainer members.

Once the gasket has been seated in the channel member at the corners, the frame 64 is moved to the raised position by means of the pneumatic cylinders 110 and 112 whereupon the refrigerator door 20 is removed from under the frame 64 and taken to another station for completing the insertion of the entire gasket into the channel members which is as described in U.S. Pat. No. 4,829,652.

It will be understood that the sequence of operations described above may be automatically controlled by any suitable programmable controller. The actuating means to pivot the frame, raise and lower the frame, cause the force to be applied to the corners and position and remove the door from under the frame may all be easily accomplished by a person having ordinary skill in the art by basic control systems utilizing commercially available control components such as electromechanical devices, sensors and electrical wiring arrangements. Therefore, for the purposes of this invention it is not necessary to describe in detail any such means or system.

While, in accordance with the Patent Statutes, there has been described what at present is considered to be the preferred apparatus and method of the invention, it will be obvious to those skilled in the art that various changes and modifications may be made thereto without departing from the invention. It is therefore intended by the appended claims to cover all such changes and modifications as fall within the true spirit and scope of the invention.

What is claimed is:

1. Apparatus for installing a stretchable gasket having a rectangular periphery and including integral magnetic means, in a channel member having a mating rectagular periphery and secured to a refrigerator door having a rectagular outer periphery with the channel member positioned adjacent the outer periphery of the door, comprising:

a rectangular shaped frame having an elongated side rail extending along each edge thereof; each of said rails having a length extending along the corresponding edge of said frame and, as viewed in lateral cross-section, having a vertical leg and a horizontal leg joined together along the length; said vertical legs forming an outer perimeter of said frame slightly greater than the outer periphery of the door, magnetic metal applying integral with said horizontal legs and arrayed in a rectangle corresponding to the rectangular shape of the gasket;

means effective to position said frame in an upwardly facing position, in which a gasket may be placed on said horizontal legs so that said magnetic metal elements thereafter releasably secure the gasket to said horizontal legs in a position surrounded by said vertical legs, and thereafter to pivot said frame to a downwardly facing position;

means actuated when said frame is in its downwardly facing position to move said frame from a raised position to a lower position in which said vertical legs closely enclose the outer periphery of the door to assure alignment of the gasket with the channel shaped member; and thereafter to return said frame to its raised position; and force applying means located at each corner of said frame and actuated when said frame is in its lower position to apply a force to corner portions of the gasket to force corresponding portions of the gasket into the channel member.

2. The apparatus of claim 1 wherein the means to pivot the frame includes at least one reversible electric motor.

3. The apparatus of claim 1 wherein the means to move the frame from a raised position to a lower position and return the frame to the raised position includes at least one pneumatic cylinder, one end of which cooperates with the frame to move the frame and the other end of which is stationary.

4. The apparatus of claim 1 wherein the means to pivot the frame includes at least one reversible electric motor and the means to move the frame from a raised position to a lower position and to return the frame to the raised position includes at least one pneumatic cylinder, one end of which carries the at least one motor and the other end of which is stationary.

5. The apparatus of claim 1 wherein the force applying means at each corner of said frame is an electromechanical device with an electrically actuated plunger that contacts the gasket and forces the gasket into the channel member at that corner.

6. The apparatus of claim 1 wherein the rectangular shaped channel member has a top wall with an open slot and the gasket has at least one winged dart projection adjacent each of its corners, said force applying means at each corner of said frame forcing the corresponding at least one dart projection through the slot of the channel member upon actuation of said force applying means.

* * * * *

UNITED STATES PATENT AND TRADEMARK OFFICE
CERTIFICATE OF CORRECTION

PATENT NO. : 5,060,358

DATED : October 29, 1991

INVENTOR(S) : Adam J. Haas; Glenn E. Crabtree

It is certified that error appears in the above-identified patent and that said Letters Patent is hereby corrected as shown below:

Column 6:

Claim 1, line 13, change "the" to read -- substantially their entire---;

line 16, change "applying" to read -- elements --;

line 35, after "force" insert -- in a direction away from said frame-

Signed and Sealed this

Twenty-first Day of September, 1993

*Attest:*

*Attesting Officer*

BRUCE LEHMAN

*Commissioner of Patents and Trademarks*